US006814212B1

(12) United States Patent
Ebersole (10) Patent No.: US 6,814,212 B1
(45) Date of Patent: Nov. 9, 2004

(54) TRANSPORT DEVICE FOR USE WITH TRANSPORT GUIDES IN CONVEYOR SYSTEMS

(75) Inventor: Jay S. Ebersole, Sterling, IL (US)

(73) Assignee: Frantz Manufacturing Company, Sterling, IL (US)

( * ) Notice: Subject to any disclaimer, the term of this patent is extended or adjusted under 35 U.S.C. 154(b) by 0 days.

(21) Appl. No.: 10/464,721

(22) Filed: Jun. 18, 2003

(51) Int. Cl.⁷ .............................................. B65G 13/00
(52) U.S. Cl. .............................. 193/35 R; 193/35 MD; 384/49
(58) Field of Search ................. 193/35 R, 35 MD; 384/49, 50, 490

(56) References Cited

U.S. PATENT DOCUMENTS

| | | | |
|---|---|---|---|
| 3,020,993 A | * 2/1962 | Heinrich et al. | ........... 193/35 R |
| 4,033,643 A | 7/1977 | Miller et al. | |
| 4,732,490 A | * 3/1988 | Masciarelli | ................... 384/49 |
| 5,390,775 A | * 2/1995 | Herrick et al. | ............. 193/35 R |
| 5,516,211 A | * 5/1996 | Barnes et al. | .................. 384/49 |
| 5,538,346 A | * 7/1996 | Frias et al. | ..................... 384/49 |
| 5,673,780 A | 10/1997 | Bidsoe | |

FOREIGN PATENT DOCUMENTS

DE 2021164 * 12/1971 ........... 193/35 MD

OTHER PUBLICATIONS

Brochure of the Ball Transfer Company, "Stud Mount Ball Transfers" and "Flange Mount Ball Transfers", 4 pages, published on or before Jun. 17, 2003.
Brochure of SKF, "Ball Transfers", 16 pages, published by SKF in Jun. 1995.
Brochure of Hudson Bearings, Inc., "Ball Transfers Flange Rollers Conveyor Bearings", 15 pages, published by Hudson Bearings, Inc., on or before Jul. 24, 1996.

* cited by examiner

Primary Examiner—James R. Bidwell
(74) Attorney, Agent, or Firm—Bell, Boyd & Lloyd, LLC (57) ABSTRACT

The present invention relates to transport devices for use with transport guides in conveyor systems. The transport device includes a transport guide stabilizer. The invention further relates to a conveyor assembly including a plurality of transport devices, each of which includes a transport guide stabilizer. The present invention increases the stability of transport guides in conveyor systems and enhances conveyance operations.

27 Claims, 6 Drawing Sheets

TRANSPORT DEVICE FOR USE WITH TRANSPORT GUIDES IN CONVEYOR SYSTEMS

BACKGROUND OF THE INVENTION

Conveyor systems for transporting articles from one place to another are well known. Certain conveyor systems include conveyor tables which function as tracks for moving boxes and other articles from one location to another. To facilitate movement in multiple directions, some of these tables include a grid of ball transfers which utilize a series of ball bearings which make contact with the articles. These known ball transfers include a main contact ball and multiple relatively small inner balls. Each ball transfer is mounted to the table.

One disadvantage associated with these ball transfers is that dirt, dust and other debris may fall between the ball transfers. As the debris accumulates over time, the debris that has fallen between the ball transfer housings can interfere with the movement of the articles rolling on the ball transfers. This debris problem can hinder performance and shorten the life of the ball transfers. Another disadvantage of these ball transfers is that each ball transfer must be mounted to the table. This can result in relatively significant installation and replacement labor costs.

Certain conveyor systems include a plate which lies on top of the ball transfers. The plate has a plurality of holes, each of which receives the main contact ball, enabling the contact balls to come into contact with the moving article. One of the known purposes of these plates is to help stabilize articles which may be non-rigid, may have a non-uniform shape or whose corners or edges may, from time to time, be positioned at an angle relative to the table. These plates are also known to decrease the amount of debris which tends to accumulate between the ball transfers.

Because these plates are mounted on the ball transfers, the ball transfers have a relatively significant role in the stability or instability of the plates. The known ball transfers described above cause these plates to have a relatively high degree of instability. This is due, in part, to the shape of these ball transfers. The portion of the ball transfer which supports the weight of the plate is fully or partially convex. Therefore, the plate, which is substantially flat, has a relatively high degree of freedom with respect to the ball transfers. This freedom of movement causes the plates to be relatively unstable. Depending upon the conveyor operating conditions, the plates can wobble and become dislodged from time to time. When this occurs, articles can become damaged or misguided, and debris may accumulate in between the ball transfers. Furthermore, this instability can result in reduced efficiency of conveyor systems, increased production down time and increased need for maintenance.

Therefore, there is a need to overcome these disadvantages.

SUMMARY OF THE INVENTION

The present invention relates to a transport device for use with transport guides in conveyor systems, and the present invention also relates to a conveyor assembly including an array of transport guides which support one or more transport guides. The transport device and conveyor assembly of the present invention aid in the transport of articles from one place to another while providing enhanced stability to transport guides, such as flat plates.

In one embodiment, the transport device of the present invention includes a rotatable contact member, such as a major ball bearing, supported by a holder. The major ball bearing is further supported in the holder by a plurality of minor ball bearings. The minor ball bearings engage the major ball bearing enabling articles to be conveyed with a relatively small degree of friction.

The holder of the transport device includes a transport guide stabilizer. In one embodiment, the transport guide stabilizer is a relatively flat load bearing surface which supports the load of the transport guide. This transport guide stabilizer provides increased stability to the transport guide during conveyor operations.

In one embodiment, the conveyor assembly of the present invention includes a plurality of the transport devices, described above, assembled in a pattern on a transport surface. The conveyor assembly further includes a transport guide, such as a plate, which in one embodiment, defines holes adapted to fit over the major ball bearing of the transport devices and a portion of the holder. The transport guide stabilizers of the transport devices provide a surface for supporting the load of the transport guide while increasing the stability of the transport guide.

By increasing the stability of the transport guide, the transport device of the present invention assists the transport guide in its role of: (a) reducing the accumulation of dirt, dust, and other debris in between the transport devices; (b) increasing the life of the transport devices; and (c) aiding in stabilizing articles which may be non-rigid, may have non-uniform shape or whose corners or edges may be positioned at an angle relative to the breakport surface or table.

It is therefore an advantage of the present invention to provide a transport device for use with transport guides in conveyor systems.

Another advantage of the present invention is to provide a transport device that increases the stability of transport guides in conveyor systems.

Yet another advantage of the present invention is to decrease the need for maintenance in conveyor systems.

Still another advantage of the present invention is to decrease damage to articles in conveyance operations.

Yet another advantage of the present invention is to decrease the amount of time and labor required to replace or re-configure transport devices in conveyor systems.

Another advantage of the present invention is to increase the life of transport devices.

Still another advantage of the present invention is to decrease down time in conveyor operations.

Additional features and advantages of the present invention are described in, and will be apparent from, the following Detailed Description of the Invention and the figures.

DETAILED DESCRIPTION OF THE INVENTION

Referring to the drawings, FIGS. 1A to 5 illustrate the transport device 10, transport device 11 and conveyor assembly 13 in various embodiments of the present invention. The transport device 10, illustrated in FIGS. 1A to 2, includes: (a) a holder 12, including a transport guide stabilizer 14; and (b) a rotatable contact member 16 rotatably supported by the holder 12. The holder 12 further includes: (a) a transport surface engagement member 18 for securing the holder 12 to a transport surface 24; (b) a body 20; (c) at least one and preferably a plurality of friction reducing members 22; and (d) a guide member, track or race 42 which holds the friction reducing members 22 in a circular formation while enabling the friction reducing members 22 to roll relative to the race 42. The transport surface engagement member 18 allows the holder 12 to be secured to a transport surface 24 such as a table or other support structure for a conveyor system. The transport surface engagement member 18 preferably includes left and right flange mount members 18a and 18b at the base or lower portion 20a of the body 20. The flange mount members 18a and 18b each include a fastener 28 which secures the holder 12 to the transport surface 24.

Figure 3:
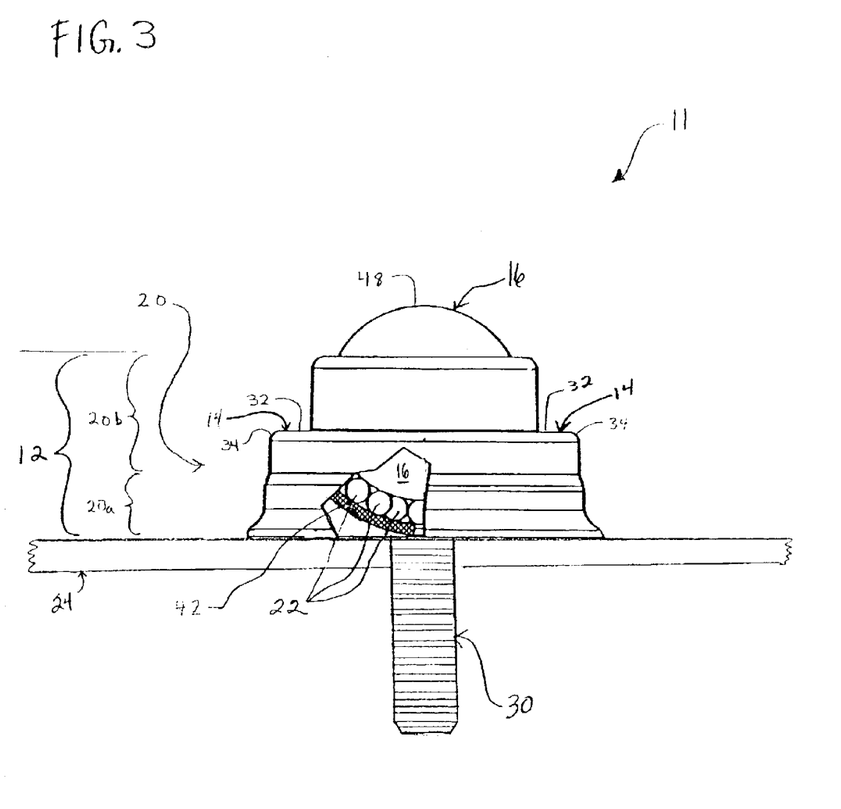
FIG. 3 is a side elevation view of the transport device including a stud mount member in a further embodiment of the present invention.

In an alternative embodiment of the present invention, shown in FIG. 3, the transport device 11 includes an elongated surface engagement member 30. The elongated transport surface engagement member is preferably a bolt, stud, rod, pin or other suitable fastener. It should be appreciated, however, that the transport device of the present invention can be attached to a conveyor structure 24 utilizing any suitable fastener or fastening technique, such as hook and loop type fasteners, adhesives and welding. It should also be appreciated that some of the transport devices of the present invention need not include a transport surface engagement member. These transport devices can be held in place by the transport guide 36 as described below.

Figure 1A:
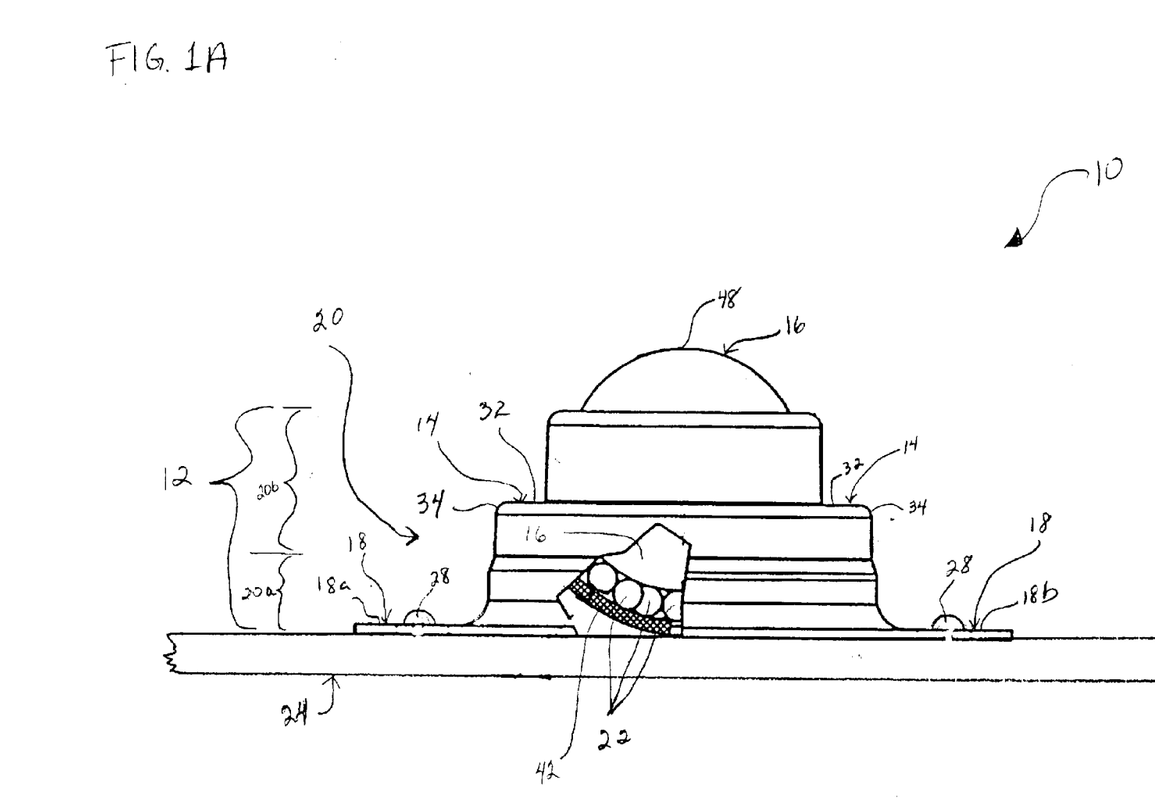
FIG. 1A is a side elevation view of the transport device in one embodiment of the present invention, showing a break-away view of the body of the transport device.
Figure 1B:
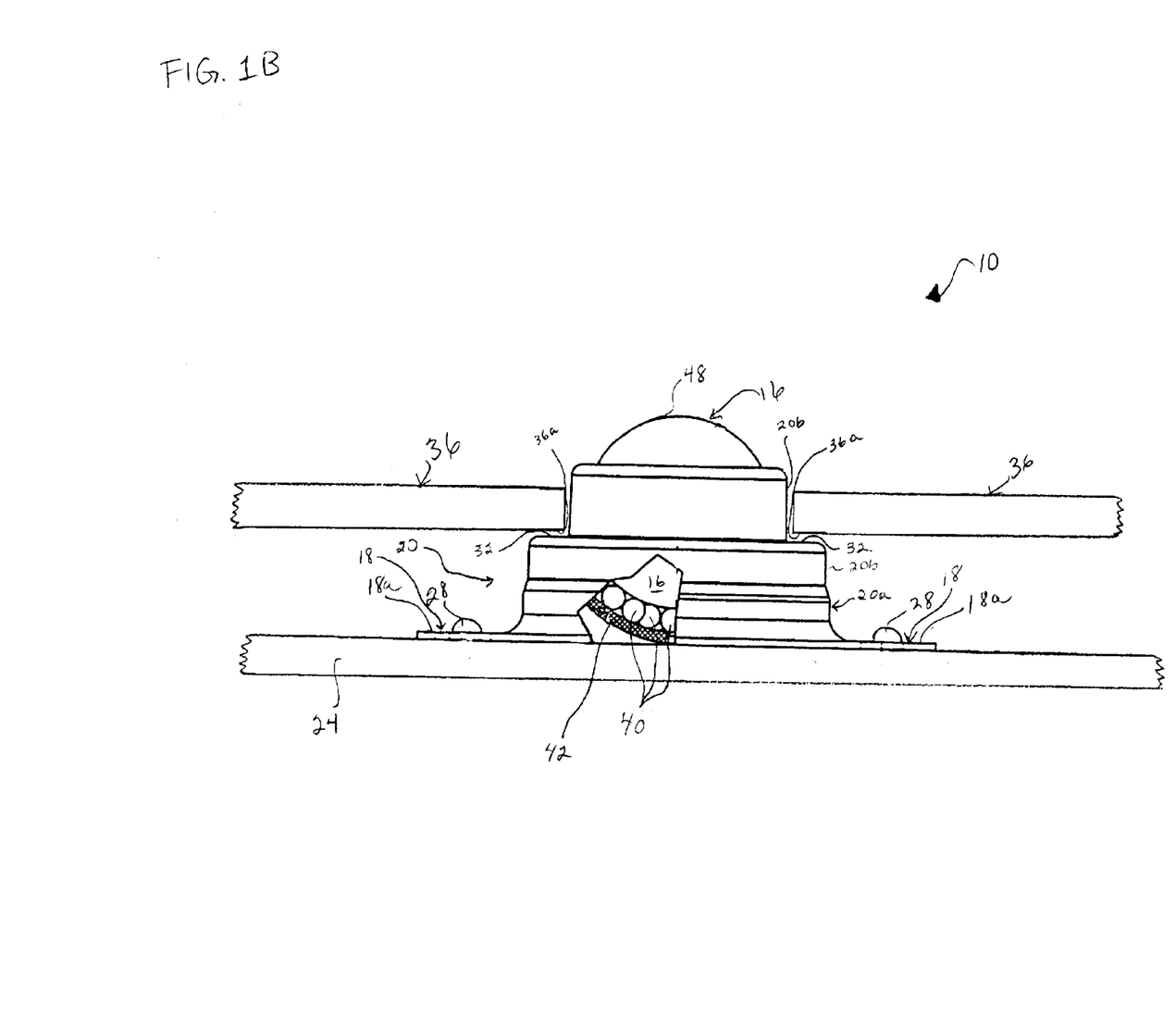
FIG. 1B is a side elevation view of the transport device of the present invention shown with a transport guide showing a break-away view of the body of the transport device.
Figure 2:
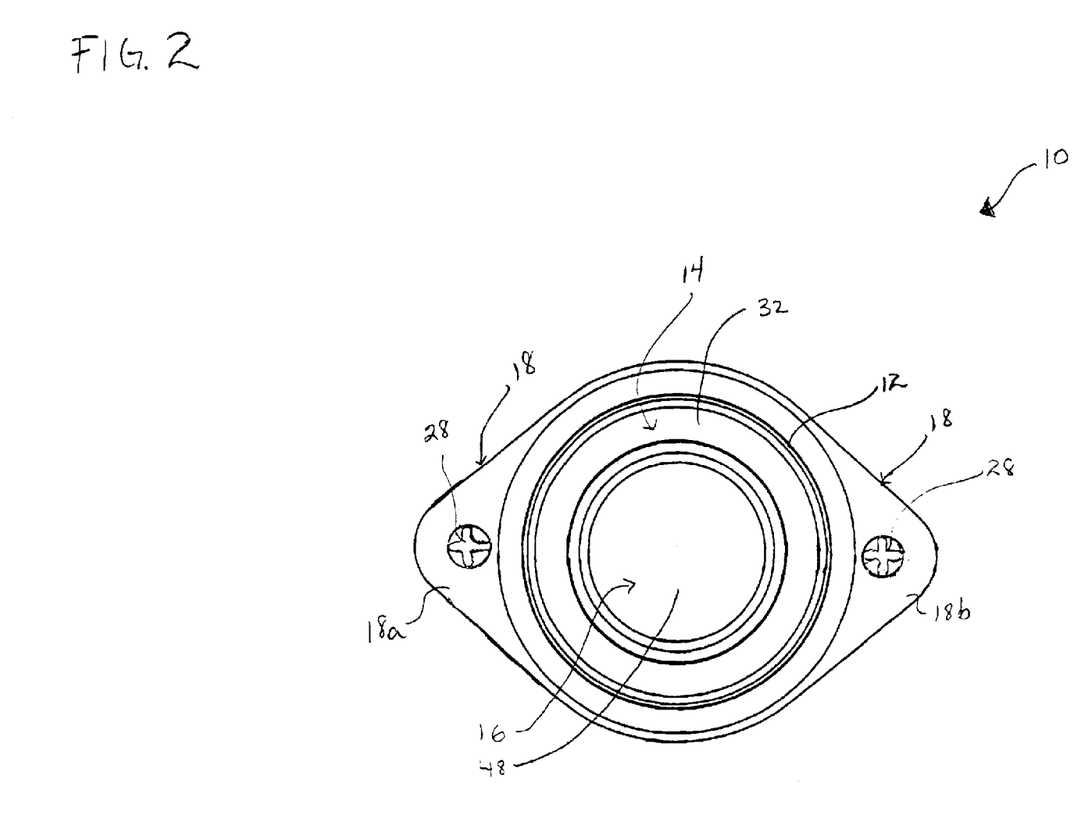
FIG. 2 is top or plan view of the transport device in one embodiment of the invention.

In transport devices 10 and 11, the body 20 of the holder 12 includes: (a) a lower portion 20a which preferably houses the friction reducing members 22 and the race 42; and (b) an upper portion 20b, rotatably supporting the rotatable contact member 16. The upper portion 20b is preferably crimp fastened to the lower portion 20a. It should be appreciated, however, that the body 20 can include a single integral piece or more than two portions.

It is preferable that each friction reducing member 22 is a relatively small ball bearing. It should be appreciated, however, that the present invention can include any suitable friction reducing member, including, but not limited to, a lubricant, a socket or any other suitable friction reducing material or device.

The transport guide stabilizer 14 includes a load bearing surface 32 and a rounded shoulder portion 34. The load bearing surface 32 is preferably flat or substantially flat and horizontally positioned surface adapted to support the load of a portion of a transport guide 36 (described below). The substantially flat or uniform configuration of the load bearing surface 32 aids in the stable support of the transport guide 36. The load bearing surface 32 limits or reduces the degrees of freedom of the transport guide 36, thereby stabilizing the transport guide 36. Specifically, it is preferable that the portion 36a of the transport guide 36 which engages the load bearing surface 32 lies in a plane which is parallel or substantially parallel to the plane in which the load bearing surface 32 lies. Therefore, a flat surface area of the load bearing surface 32 receives a substantially uniform load pressure from a flat surface area of the portion 36a. Consequently, the transport guide 36 is preferably less likely to wobble or move relative to the transport devices of the present invention.

It should be appreciated that in other embodiments not illustrated, the transport guide stabilizer of the present invention can include any suitable transport guide engagement member which engages the transport guide 36 in a removable fashion. Such transport guide engagement member need not be flat or substantially flat. For example, such transport guide engagement member can include a suitable mating member which mechanically mates with the transport guide 36, such as one or more notches, protrusions or other irregularities which mate with one or more notches, protrusions or irregularities of the transport guide 36. In another example, such transport guide engagement member can include a suitable fastener which removably attaches the transport guide 36 to the transport guide stabilizer 14, such as an adhesive or hook and loop type fastener. In any case, the transport guide stabilizer 14 of the present invention is configured to aid in the stability of or otherwise increase the stability of the transport guide 36.

Figure 4:
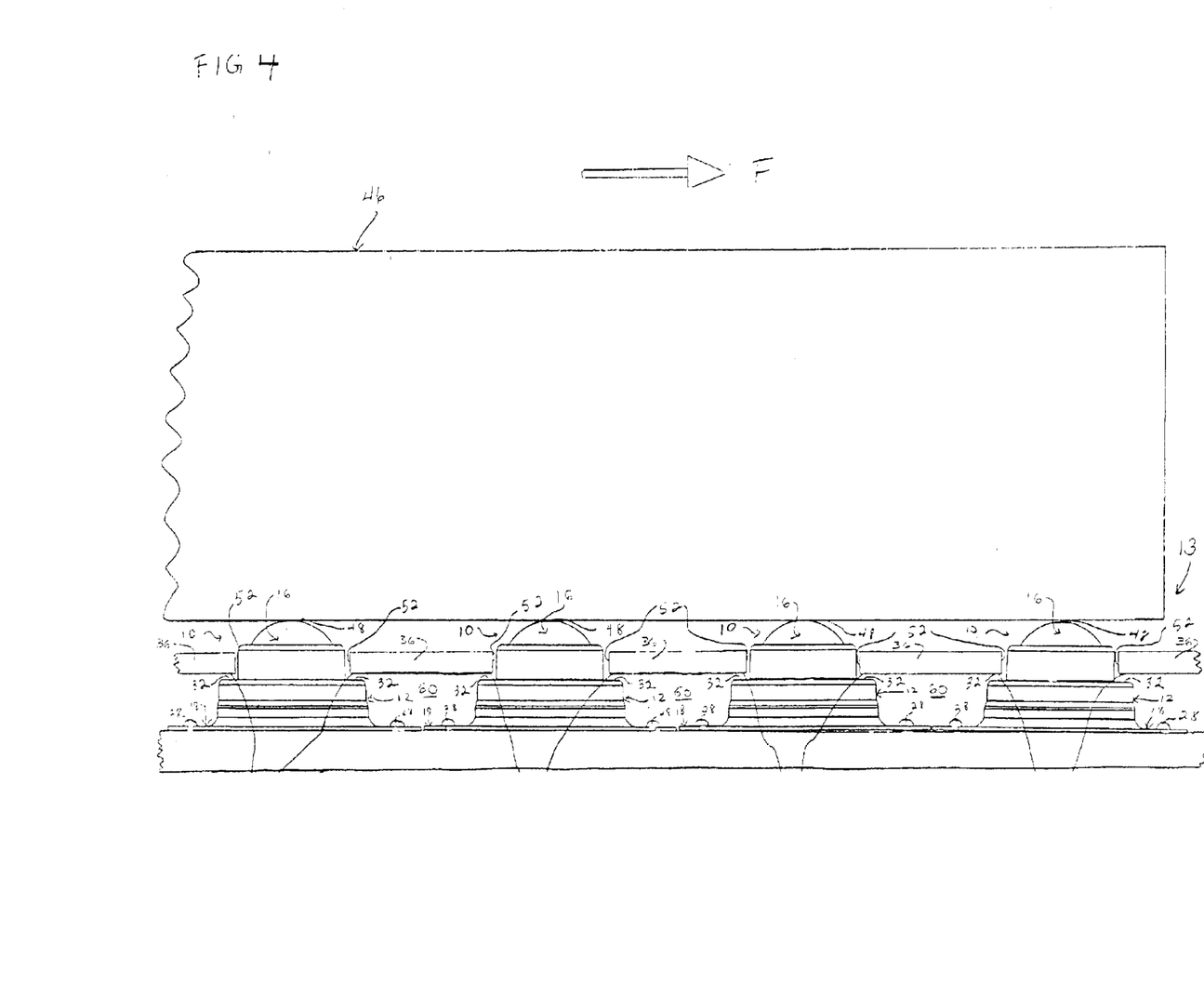
FIG. 4 is a side elevation view of the conveyor assembly and an article to be transported, in one embodiment of the invention.

The rotatable contact member 16 of the transport device 10 can include any device or member capable of rotational movement, such as a ball, wheel or roller. In one embodiment, the rotatable contact member 16 is a relatively large ball bearing which is rotatably supported by the friction reducing members 22 and held in place by the top portion 20b of the body 20. As illustrated in FIG. 4, an article 46 to be transported is supported by the top surface 48 of the rotatable contact member 16. As the article 46 moves across the transport device 10, the rotatable contact member 16 rotates against the friction reducing members 22.

Figure 5:
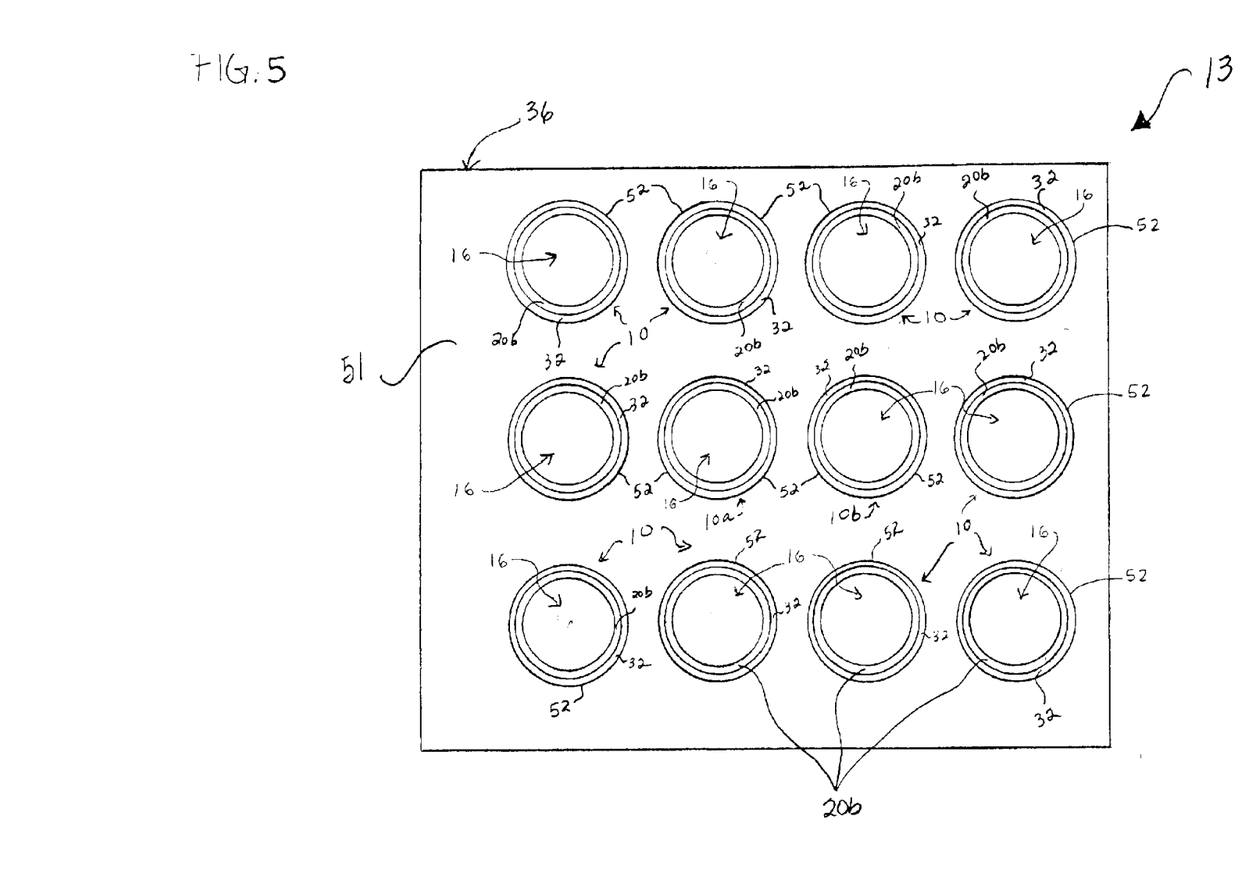
FIG. 5 is a top or plan view of the conveyor assembly in one embodiment of the resent invention.

In one embodiment illustrated in FIGS. 4 and 5, the present invention includes a conveyor assembly 13 including: (a) a plurality of transport devices 10, 10a and 10b preferably arranged in a grid or matrix configuration; and (b) a transport guide 36 supported by the transport guide stabilizers 14 (specifically, the load bearing surface 32) of the transport devices 10, 10a and 10b.

In the conveyor assembly 13, the transport surface engagement members of certain transport devices 10a and 10b (shown in FIG. 5) do not need to have a fastener 28 or any other fastener which secures these transport devices 10a and 10b to the conveyor surface 24. Here, the transport device receiving walls 52 of the transport guide 36 restrain or limit the movement of the transport devices 10a and 10b relative to the conveyor surface 24. Accordingly, the transport guide 36 maintains the transport devices 10a and 10b in a predetermined position during conveyor operations. Consequently, a user can replace transport devices 10a and 10b by lifting the transport guide 36, picking up the transport devices 10a and 10b and placing new transport devices in the place of transport devices 10a and 10b.

The transport guide 36 is preferably a substantially flat plate 51 having a plurality of transport device receiving walls 52 which define a plurality of apertures (not shown) to receive the rotatable contact member 16 and top portion 20b of the transport device 10.

As shown in FIG. 4, an article 46 to be transported by the conveyor assembly 13 is placed upon the top portion 48 of the rotatable contact members 16 of the plurality of transport devices 10. The transport devices 10 facilitate the movement of the article 46 by providing a surface of reduced friction upon which the article 46 is transferred. As the rotatable contact members 16 rotatably engage the friction reducing members 22 of the transport devices 10, the force necessary to start and sustain the movement of an article 46 placed on the transport devices 10 is reduced.

When seated on the transport guide stabilizers 14, the transport guide 36 preferably reduces the accumulation of dirt, dust or other debris in the spaces 60 between the transport devices 10. When articles 46, which may be non-rigid, may have non-uniform shapes or may be positioned at an angle relative to the conveyor structure 24, are conveyed, the transport guide 36 functions as an aid to stabilize the articles 46.

Method of Use

In one embodiment, the present invention includes a method of transporting an article including the steps of: (a) providing a plurality of transport devices 10 assembled in a pattern and mounted on a surface 24; (b) providing a transport guide stabilizer 14 on each of the transport devices 10; (c) placing a transport guide 36 on top of the transport devices 10; and (d) enabling a force to be applied to an article 46 in order to move the article 46 along the conveyor assembly 13. The transport guide 36 guides the movement of the article 46. The transport guide 36 further reduces the collection of dust and debris in the spaces 60 between the transport devices 10 which may enter the holder 12.

Materials

The transport devices 10 and 11, and the conveyor assembly 13 of the present invention may be manufactured from any suitable material. The rotatable contact member 16, the friction reducing members 22 and the holder 12 may be manufactured from any suitable material such as steel or other metals, polymers, plastics and/or rubber. In one embodiment, the rotatable contact member 16 and the friction reducing members 22 are made of steel, the holder 12 is made of sheet metal and the transport guide 36 is made of aluminum, steel, plexiglass, stainless steel, plastic or other materials.

In one embodiment, the rotatable contact member 16 is approximately one inch in diameter, and the holder 12 is approximately one inch in height and approximately two inches in width, excluding the width of the transport surface engagement member 18. The transport guide stabilizer is preferably located approximately one-half inch above the transport surface engagement member 18.

The transport device of the present invention, in one embodiment includes a rotatable contact member supported by a holder, wherein the holder includes a transport guide stabilizer which stabilizes a substantially flat transport guide. In one embodiment, the transport guide stabilizer includes a substantially flat surface which supports the load of the transport guide. In another embodiment, the conveyor assembly of the present invention includes a plurality of transport devices assembled in a grid, and a transport guide supported by the transport guide stabilizers of the transport devices. The transport guide reduces the accumulation of dirt, dust and/or debris which may enter the holder portion of the transport devices, while simultaneously serving as an aid to stabilize transported articles which, due to their flexibility, shape or direction of motion may tend to travel along a conveyor system in an undesirable fashion. The present invention therefore enhances the stability of the transport guides in conveyor systems and increases the life of transport devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A transport device for use in conjunction with a transport guide in conveyance of an article, the transport guide having an upper surface, a lower surface and a plurality of inner walls defining a plurality of apertures, the transport device comprising:

a holder including a transport guide stabilizer having: (a) a first wall positioned so as to engage the lower surface of the transport guide; and (b) a second wall positioned so as to engage one of the inner walls of the transport guide; and a rotatable contact member rotatably supported by the holder.

2. The transport device of claim 1, wherein the first wall includes a substantially horizontal flat surface.

3. The transport device of claim 1, wherein the first wall includes at least one substantially flat load bearing surface.

4. The transport device of claim 1, wherein the rotatable contact member includes a member selected from the group consisting of a ball, a wheel and a roller.

5. The transport device of claim 1, wherein the rotatable contact member includes a material selected from the group consisting of steel, metal, and a polymer material.

6. The transport device of claim 1, wherein the holder has a transport surface engagement member, a body and at least one friction reducing member, wherein the body includes the transport guide stabilizer.

7. The transport device of claim 6, wherein the friction reducing member includes a member selected from the group consisting of a ball bearing, a lubricant and a socket.

8. The transport device of claim 6, wherein the first wall includes a substantially flat portion which lies in a plane which is substantially parallel to the transport guide.

9. The transport device of claim 6, wherein the transport surface engagement member includes a flange mounting member.

10. The transport device of claim 6, wherein the transport surface engagement member includes an elongated fastener.

11. A conveyor assembly for conveyance of articles, the conveyor assembly comprising:

a transport guide having an upper surface, a lower surface and a plurality of inner walls defining a plurality of apertures; and a plurality of transport devices positioned on a support surface, each of the transport devices having a transport guide stabilizer and a rotatable contact member, each of the transport guide stabilizers having: (a) a first wall positioned so as to engage the lower surface of the transport guide; and (b) a second wall positioned so as to engage one of the inner walls of the transport guide.

12. The conveyor assembly of claim 11, wherein each of the first walls has a substantially flat load bearing surface.

13. The conveyor assembly of claim 11, wherein the first wall includes a shoulder portion.

14. The conveyor assembly of claim 11, wherein the first wall includes a substantially flat portion which removably engages the lower surface of the transport guide stabilizer.

15. The conveyor assembly of claim 11, wherein the rotatable contact member includes a member selected from the group consisting of a ball, a wheel and a roller.

16. A method for conveying articles comprising:

(a) providing a transport surface;

(b) positioning a plurality of transport devices on the transport surface, each of the transport devices including a transport guide stabilizer having a first wall and a second wall;

(c) fastening at least one of the transport devices to the transport surface;

(d) positioning a transport guide over the transport devices, the transport guide having an upper surface, a lower surface and a plurality of inner walls defining a plurality of apertures, thereby causing: (i) each of the first walls of the transport devices to engage the lower surface of the transport guide; and (ii) each of the second walls of the transport devices to engage one of the inner walls of the transport guide;

(e) positioning the articles on a portion of the transport devices; and (f) applying a force to the articles.

17. The method of claim 16, wherein step (d) includes the step of providing a plurality of first walls each of which includes a substantially flat portion adapted to engage the lower surface of the transport guide.

18. The method of claim 16, wherein step (d) includes the step of causing a substantially flat surface to engage the lower surface of the transport guide.

19. A transport device for use in conjunction with a transport guide, the transport guide having an upper surface, a lower surface and plurality of inner walls defining a plurality of openings, the transport device comprising:

a holder having: (a) a first wall positioned so as to engage the lower surface of the transport device; and (b) a second wall having a size and position so as to protrude through one of the openings and engage the inner wall defining said opening; and a rotatable contact member rotatably supported by the holder.

20. The transport device of claim 19, wherein the first wall includes a substantially horizontal surface.

21. The transport device of claim 19, wherein the second wall includes a substantially vertical surface.

22. The transport device of claim 19 which includes a stepped configuration defined by an intersection of the first wall and the second wall.

23. The transport device of claim 19, wherein the second wall has a region which covers a portion of the rotatable contact member.

24. The transport device of claim 19, wherein the rotatable contact member includes a member selected from the group consisting of a ball, a wheel and a roller.

25. The transport device of claim 19, wherein the rotatable contact member includes a material selected from the group consisting of steel, metal, and a polymer material.

26. The transport device of claim 19, which includes a transport surface engagement member having a flange mounting member.

27. The transport device of claim 19, which includes a transport surface engagement member having an elongated fastener.

* * * * *